United States Patent [19]

Deckler

[11] Patent Number: 5,139,314
[45] Date of Patent: Aug. 18, 1992

[54] LOAD EQUALIZING, DUAL WHEELS FOR GRAIN CART

[75] Inventor: Harry C. Deckler, Williamsburg, Iowa

[73] Assignee: Kinze Manufacturing, Inc., Williamsburg, Iowa

[21] Appl. No.: 703,186

[22] Filed: May 20, 1991

[51] Int. Cl.$^5$ ............... B60G 1/00; B60B 11/00
[52] U.S. Cl. ............... 301/36 R; 301/36 WP; 280/688; 180/906
[58] Field of Search ............... 280/688, 6.11; 180/905, 180/906; 301/36 R, 36 WP

[56] References Cited

U.S. PATENT DOCUMENTS

| | | | |
|---|---|---|---|
| 2,208,599 | 7/1940 | Ronning | 301/36 WP |
| 2,208,600 | 7/1940 | Ronning | 301/36 WP |
| 2,209,094 | 7/1940 | Ronning | 301/36 WP |
| 2,209,095 | 7/1940 | Ronning | 301/36 WP |
| 3,460,698 | 8/1969 | Harris . | |
| 4,274,790 | 6/1981 | Barker . | |

OTHER PUBLICATIONS

*Introducing The Harvest-Flow 590 Grain Cart That Will Reduce Your Grain Handling Cost*, Port-A-Frame Company, Atkinson, Ill. (date unknown).
*KINZE 40 Series Auger Wagons*, Kinze Manufacturing, Inc., Williamsburg, Iowa (Aug. 1990).
*KINZE M0142 Operator & Parts Manual 40 Series Grain Auger Wagons*, p. 3—3, Kinze Manufacturing, Inc., Williamsburg, Iowa (Apr. 1990).
*Kinze Auger Wagons*, Sep. 1987, (brochure).
*E-Z Trail, Inc. Harvesting America*, (date unknown) (brochure).
*Parker 6000 Grain Buggy*, (date unkown) (brochure).

Primary Examiner—Charles A. Marmor
Assistant Examiner—Tamara L. Graysay
Attorney, Agent, or Firm—Emrich & Dithmar

[57] ABSTRACT

First and second pairs of wheels are mounted to respective sides of a grain cart in a manner which avoids tire "scrubbing," such as when a tire is forced sideways over a support surface without rotation, as the cart is displaced in a turning manner over uneven soil. Each pair of wheels includes an inner and an outer wheel coupled together by pivoting linkage which allows each wheel to move either upward or downward over uneven soil while vertically displacing the other wheel in the opposite direction. On level ground, the linkage provides a positive camber for a pair of inner and outer wheels, with lower portions of adjacent wheels in contact with the soil more closely spaced than upper portions of the wheels. As the relative elevation of the wheels changes as the cart traverses uneven soil, wheel camber changes from positive to negative, wherein upper portions of adjacent wheels are more closely spaced than lower portions of the wheels. This inward tilting of adjacent inner and outer wheels with differences in individual wheel elevation maintains lateral spacing between the contact points of adjacent wheels with the soil essentially constant over the full range of wheel elevation differences and prevents tire scrubbing as the cart traverses uneven soil.

17 Claims, 2 Drawing Sheets

LOAD EQUALIZING, DUAL WHEELS FOR GRAIN CART

FIELD OF THE INVENTION

This invention relates generally to carts such as used in the collection and transport of grain and is particularly directed to a load equalizing, dual wheel arrangement for a grain cart which improves cart transport particularly in uneven soil conditions.

BACKGROUND OF THE INVENTION

Grain is generally harvested using a combine. The combine separates the grain from the leafy portion of the plant and other residue and stores the grain in a hopper, or bin, in the combine. The grain is then typically off-loaded from the combine by means of an auger into a grain cart for temporary storage prior to transport to an elevator. In most cases, the grain cart is drawn by a tractor alongside the combine during grain off-loading in an "on-the-go" manner to eliminate combine down-loading time.

Ideally, grain cart capacity should be as large as possible to minimize interruptions in combine operation for off-loading of the grain. However, grain cart size is limited by practical considerations such as the size of the tractor pulling the cart and the condition of the fields in which the cart operates including such factors as wetness, surface irregularities and slope.

Grain carts are typically of the four wheel or two wheel type. A four wheel grain cart typically includes a pivoting tongue attached to the two forward wheels to provide a grain cart steering capability. Four wheel grain carts without a steering capability suffer from limited mobility and are difficult to maneuver particularly in uneven soil conditions such as encountered when ridge tilling is employed. For example, turning a cart without steering causes its forward wheels to pivot about a turning axis in one direction and its aft wheels to pivot about this axis in an opposite direction. As a result, tire "scrubbing" occurs wherein the tire is pulled over the soil surface in a direction not in the plane of the tire which prevents the tire from rotating. Tire scrubbing increases the pulling force required of the tractor to which the grain cart is attached, stresses bearings and other cart components, and breaks down soil ridges when this type of tillage is employed resulting in increased erosion. In addition, tire scrubbing causes excessive tire wear and considerable expense to the farmer because of the high cost of grain cart tires.

Single axle grain carts having a wheel on each side of the cart do not suffer from tire scrubbing as the cart is turned. In this case, the cart's axle is aligned with its turning axis. However, larger grain carts having a single axle and employing a walking tandem wheel arrangement wherein a pair of wheels is disposed fore and aft on each side of the cart are more difficult to maneuver particularly over uneven soil primarily because of tire scrubbing. The present invention is intended to eliminate this limitation in single axle grain cart maneuverability and mobility by providing a single axis grain cart with equalizing dual wheels.

OBJECTS AND SUMMARY OF THE INVENTION

Accordingly, it is an object of the present invention to facilitate transport of a grain cart particularly over uneven soil such as encountered in ridge tilled soil conditions.

Another object of the present invention is to provide a single axle, dual wheel arrangement for a grain cart which eliminates tire "scrubbing" during turns over uneven soil.

Yet another object of the present invention is to maintain the relative surface contact points of a pair of tires mounted in a side-by-side manner on the side of a grain cart essentially constant as the relative height of the tires changes when traversing uneven surfaces.

A further object of the present invention is to equalize the load on a pair of side-by-side tires on a grain cart as the grain cart traverses unequal ground for improved cart stability and maneuverability.

A still further object of the present invention is to reduce the wear and tear on a grain cart and particularly its tires as it is pulled by a tractor.

This invention contemplates an agricultural cart for hauling large quantities of grain or the like by means of a tractor, the grain cart comprising: a frame including a tongue; a hitch for securing the tongue to the tractor; a hopper mounted to the frame; and first and second dual wheel assemblies mounted respectively to the left and right sides of the frame for supporting the frame and the hopper, each assembly including first and second wheels and first and second wheel supports for supporting the first and second wheels, respectively, and characterized in that all four wheels are aligned along a common axis of rotation when the wheels are on level ground, each dual wheel assembly further comprising a pivot link pivotally mounted at an intermediate location to the frame for vertical pivotal motion, the outboard ends of the pivot link being pivotally connected to the first and second wheel supports, respectively, whereby as one of the wheels of an assembly is moved vertically, the complementary wheel moves in the opposite vertical direction to accommodate variation in ground contour, and a camber link interconnecting the first and second wheel supports such that the ground contact points of the first and second wheels maintain a substantially constant lateral displacement as the wheels adjust vertically to variations in ground contour.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
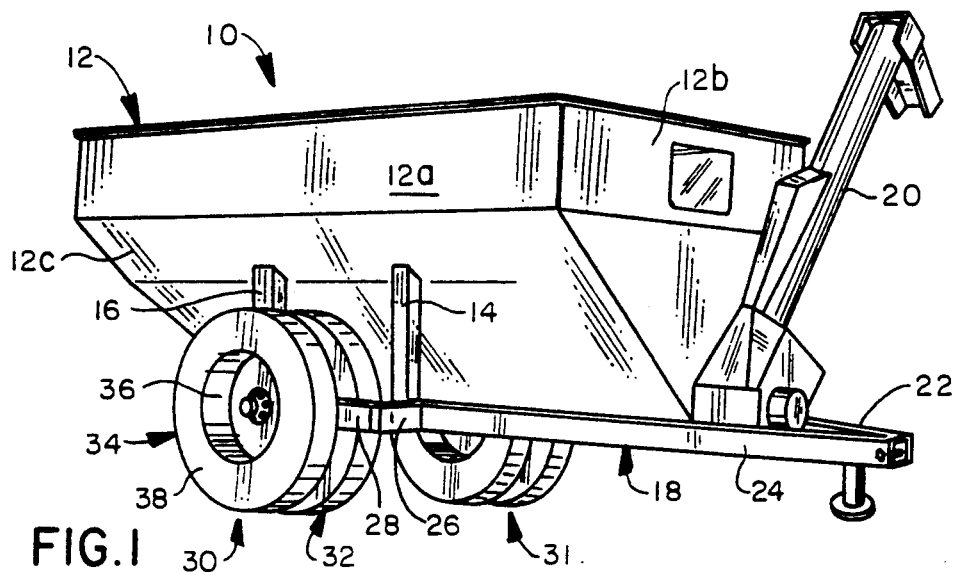
FIG. 1 is a perspective view of a grain cart incorporating load equalizing, dual wheels in accordance with the present invention.

Referring to FIG. 1, there is shown a perspective view of a grain cart 10 incorporating a load equalizing, dual wheel arrangement in accordance with the present invention. The grain cart 10 includes a bin 12 having an open upper portion into which grain is deposited. Bin 12 includes a pair of facing vertical side panels, only one of which is shown as element 12a in the figure, a front panel 12b, and an aft panel which is not shown in the figure for simplicity. A lower portion of the bin 12 is generally V-shaped and includes a pair of inwardly sloped lower side panels 12c, only one of which is shown in the figure for simplicity.

The grain cart 10 includes a dual auger system including a horizontal auger (not shown in the figure) disposed within a lower portion of the grain cart and a vertical unloading auger 20. The vertical unloading auger 20 is force fed by the horizontal auger for unloading grain from the grain cart 10. The vertical unloading auger 20 is disposed on a forward portion of the grain cart 10 and is coupled at its lower end to the horizontal auger for receiving grain therefrom.

The grain cart bin 12 is positioned upon and supported by an undercarriage structure 18 which includes first and second pairs of dual wheels 30 and 31. A pair of forward and a pair of aft bin support members 14 and 16 each disposed on respective sides of the grain cart bin 12 provide support for the bin on the undercarriage structure 18. The undercarriage structure 18 includes a fork-like forward portion including a pair of forward structural members 24 generally in the form of box beams. The two forward structural members 24 form a tongue structure to facilitate towing of the grain cart 10. Disposed at the juncture of the two forward structural members 24 is a hitch mechanism 22 for attaching the grain cart 10 to a tractor (not shown) for pulling. The two forward structural members 24 diverge as they extend rearwardly and terminate in outwardly extending intermediate side frame members 26. Extending rearward from each of the intermediate side frame members 26 is an aft side frame member 28 to which a pair of dual wheels is attached. Thus, as shown for the side of the grain cart 10 viewed in FIG. 1, the first pair of dual wheels 30 is coupled to the aft side frame member 28 as described in detail below. The pair of dual wheels 30 includes an inner wheel 32 and an outer wheel 34 each disposed on a respective side of the aft side frame member 28. Each of the inner and outer wheels 32, 34 includes an inner wheel rim 36 and an outer pneumatic tire 38. As the inner and outer wheels 32, 34 of the first pair of dual wheels 30 traverse uneven soil, the relative elevation of these wheels will change. The present invention, by allowing each of the inner and outer wheels 32, 34 to freely move up and down in a complementary manner equalizes the weight distributed on each of the wheels for improved cart maneuverability and stability. This load equalizing arrangement also reduces tire wear and stress on bearings and other cart components. By maintaining the lateral spacing between the points of contact of each wheel's tire fixed over the full range of relative wheel height, dual wheel rotation is ensured as the cart traverses uneven soil to eliminate tire scrubbing.

Figure 2:
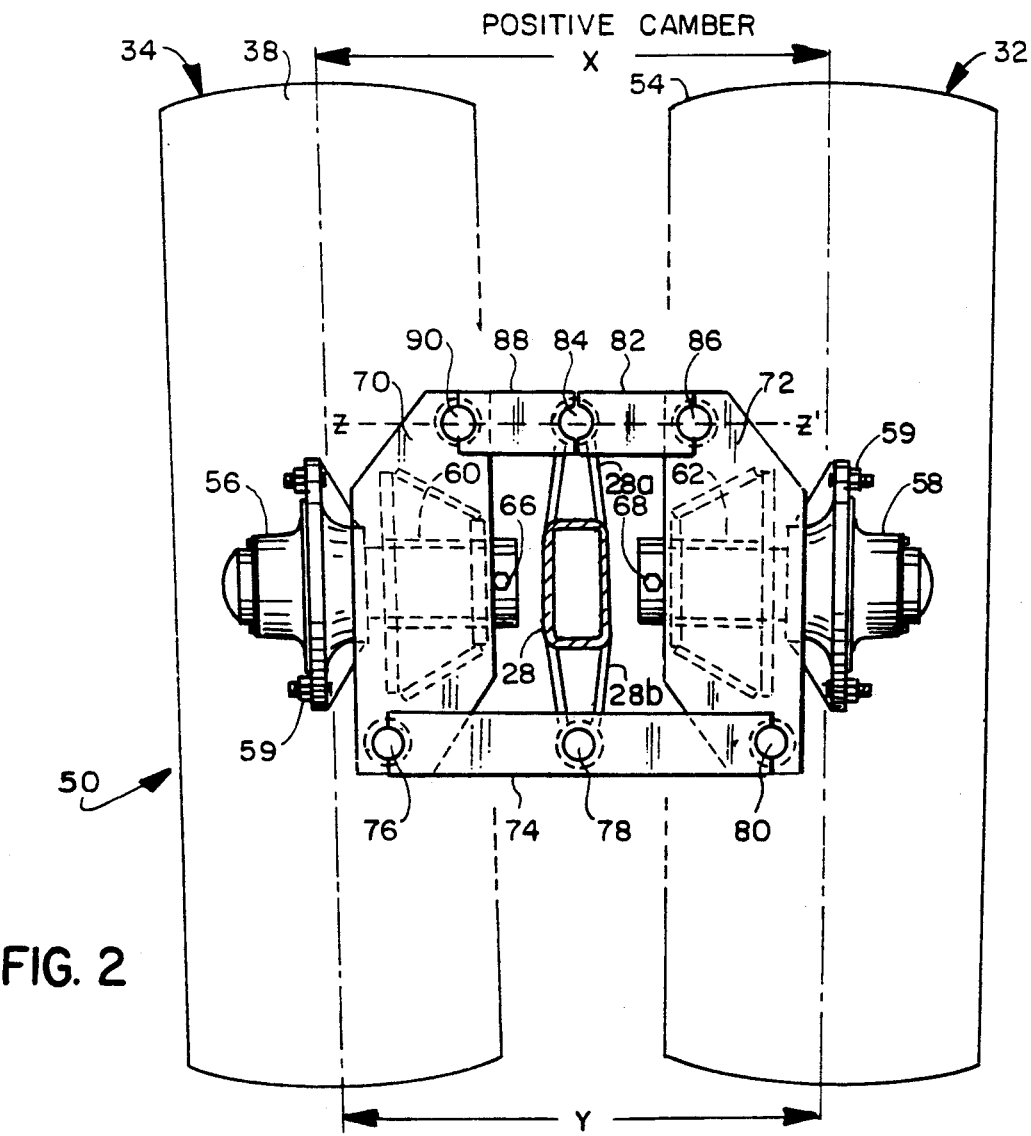
FIG. 2 is a front plan view shown partially in phantom illustrating details of a load equalizing, dual wheel arrangement for a grain cart in accordance with the present invention wherein the wheels are positioned upon a level support surface, with each wheel generally at the same height.
Figure 3:
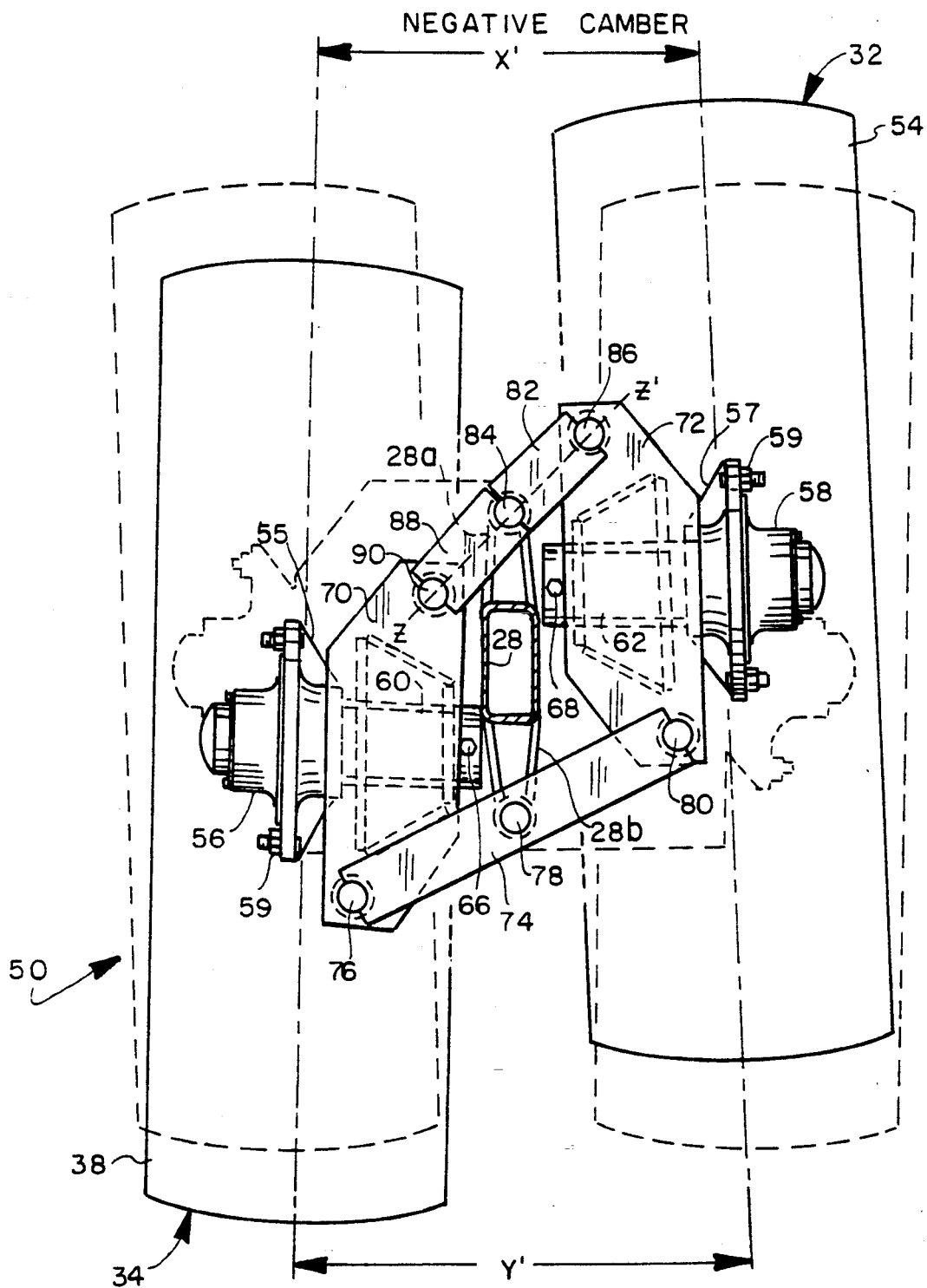
FIG. 3 is a front plan view similar to that shown in FIG. 2 showing the two wheels at different heights while maintaining wheel load equalization.

Referring to FIG. 2, there is shown a front plan view shown partially in phantom of a wheel mounting arrangement 50 in accordance with the present invention. FIG. 3 is a view similar to that of FIG. 2 showing the two wheels at different heights such as when the cart traverses uneven soil. The wheel mounting arrangement 50 couples first and second wheels 34 and 32 in a pivoting manner allowing the grain cart to be displaced over an uneven support surface without the occurrence of tire scrubbing. The first wheel 34 includes a first tire 38 as well as an inner rim which is not shown for simplicity. Similarly, the second wheel 32 includes a second tire 54 and an inner rim which also is not shown. Each of the first and second tires 38, 54 is preferably of the pneumatic type.

Each of the wheel rims is coupled to a respective one of first and second hubs 56 and 58 by means of a plurality of nut and bolt 59 combinations. Coupled to and extending inwardly from the first hub 56 is a first support spindle 60 shown in dotted-line form. Similarly, coupled to and extending inwardly from the second hub 58 is a second support spindle 62. The first spindle 60 extends through a first support member 70 and is maintained in position thereon by means of a first retaining bolt 66. Similarly, the second spindle 62 extends through and is coupled to a second support member 72 by means of a second retaining bolt 68.

Attached to respective lower portions of the first and second support members 70, 72 is a lower pivot link 74. Respective ends of the lower pivot link 74 are pivotally coupled to the first and second support members 70 and 72 by means of first and second end pivots 76 and 80. A center portion of the pivot link 74 is pivotally coupled to a lower portion of the cart side frame member 28 by means of a center pivot 78. The cart side frame member 28 includes upper and lower extensions 28a and 28b, with the lower link 74 coupled to the latter via the center pivot 78. Pivot link 74 is thus pivotally coupled to the first and second support members 70, 72 as well as to the cart side frame member 28. Pivot link 74 serves to displace the first and second wheels 34, 32 in vertically opposed directions as the grain cart traverses an uneven surface. With reference to FIG. 3, it can be seen that as the first wheel 34 moves downward, the second wheel 32 is displaced upward by the pivoting action of the pivot link 74 about its center pivot 78. Correspondingly, where the second wheel 32 moves downward such as when traversing a lower portion of the support surface, the first wheel 34 will be displaced vertically upward in a complementary manner.

Pivotally coupled to the upper extension 28a of the cart side frame member 28 and the second support member 72 is a first upper camber link 82. Respective ends of the first camber link 82 are pivotally coupled to the cart side frame member 28 and the second support member 72 by means of an inner pivot 84 and a first outer pivot 86, respectively. Pivotally coupled to the upper extension 28a of the cart side frame member 28 and the first support member 70 is a second upper camber link 88. Respective ends of the second camber link 88 are pivotally coupled to the cart side frame member 28 and the first support member 70 by means of the inner pivot 84 and a second outer pivot 90. Thus, upper portions of the first and second support members 70, 72 are pivotally coupled together by means of first and second camber links 82, 88 via the cart side frame member 28. The use of two independent connecting links between the upper portions of the first and second support members 70, 72 and the cart side frame member 28, permits each of the support members to be pivotally displaced relative to the cart side frame member independently of the other support member and introduces some flexure in the pivoting coupling of the two wheels to the cart side frame member. The various pivots coupling the lower pivot and upper camber links to the first and second support members 70, 72 as well as to the cart side frame member 28 may be conventional pins or shafts maintained in position by conventional means such as cotter keys (not shown for simplicity).

As shown in FIG. 2, the wheel mounting arrangement 50 provides a positive camber for the first and second wheels 34, 32, where $X>Y$, with the wheels positioned on a level support surface. Thus, with the first and second wheels 34, 32 at essentially the same height, the wheels are tilted slightly outwardly from one another in an upward direction. In one embodiment, $X=32.562$ inches (82.707 centimeters) while $Y=30.375$ inches (77.153 centimeters) with the first and second wheels 34, 32 at the same height. As the height of the first and second wheels 34, 32 changes over an uneven support surface, as shown in FIG. 3, wheel camber changes from positive to negative, where $X'<Y'$. Thus, where the first and second wheels 34, 32 traverse an uneven support surface, the wheels are tilted inwardly toward one another in proceeding from a lower portion to an upper portion of the wheels. At full vertical displacement between the first and second wheels 34, 32 $X'=26.25$ inches (66.68 centimeters) and $Y'=30.188$ inches (76.68 centimeters) in a preferred embodiment. The wheel mounting arrangement 50 thus causes wheel camber to change from positive to negative as the wheels transit a flat support surface to an uneven surface. This results in the horizontal spacing between the contact points of the first and second tires 38, 54 with the support surface remaining essentially constant regardless of the relative height of the first and second wheels 34, 32. Thus, Y (30.375 inches) or 77.153 centimeters is essentially equal to Y' (30.188 inches or 76.68 centimeters) over the full range of wheel height differences. This prevents tire scrubbing regardless of the degree of unevenness of the support surface. This is made possible by the unique linkage in the wheel mounting arrangement 50, wherein the lower pivot linkage is longer than the upper camber linkage which includes two independent links allowing for some flexure in the pivoting displacement of the first and second wheel assemblies about the cart side frame member 28.

As shown by dotted-line Z—Z' in FIG. 2, the inner pivot 84 and the two outer pivots 86 and 90 are generally colinear when the first and second wheels 34 and 32 are positioned on a level surface and at the same height. However, as shown by dotted-line Z—Z' in FIG. 3, when the first and second wheels 34, 32 traverse uneven ground, the inner pivot 84 and the two outer pivots 86 and 90 are not co-linear. As shown in FIG. 3, in the latter case inner pivot 84 is disposed above line Z—Z' connecting the first and second outer pivots 86 and 90. This nonlinear alignment of these three pivots is provided for by the aforementioned flexure of the two link combination of the first and second upper links 82 and 88. Maintaining these three pivots co-linear during traversal of uneven ground would cause the wheel mounting arrangement 50 to lock-up.

There has thus been shown a load equalizing, dual wheel arrangement particularly adapted for use in a grain cart which eliminates tire scrubbing, or forcing the tire sideways over a support surface without rotation, when uneven soil is traversed. As the relative elevation of the wheels changes, wheel camber changes from positive to negative, wherein upper portions of adjacent wheels are more closely spaced than lower portions of the wheels. Changing wheel camber with changes in individual wheel elevation maintains lateral spacing between contact points of adjacent wheels which is advantageous in row cultivating operations and also prevents tire scrubbing as the cart traverses uneven soil.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. An agricultural cart for hauling material by means of a tractor, said grain cart comprising:
    a frame including a tongue;
    hitch means for securing said tongue to said tractor;
    a hopper mounted to said frame; and
    first and second dual wheel assemblies mounted respectively to the left and right sides of said frame for supporting said frame and said hopper, each assembly including first and second wheels and first and second wheel supports for supporting said first and second wheels, respectively, and characterized in that all four wheels are aligned along a common axis of rotation when said wheels are on level ground, each dual wheel assembly further comprising pivot link means pivotally mounted at an intermediate location to said frame for vertical pivotal motion, the outboard ends of said pivot link means being pivotally connected to said first and second wheel supports, respectively, whereby as one of the wheels of an assembly is moved vertically, the complementary wheel moves in the opposite vertical direction to accommodate variation in ground contour, and camber link means interconnecting said first and second wheel supports such that the ground contact points of said first and second wheels maintain a substantially constant lateral displacement as said wheels adjust vertically to variations in ground contour.

2. The grain cart of claim 1, wherein said camber link means is shorter than said pivot link means.

3. The grain cart of claim 2, wherein said pivot link means includes a first linear, elongated rigid member pivotally coupled at respective ends to said first and second wheel supports and pivotally coupled and at intermediate location along the length thereof to said frame.

4. The grain cart of claim 3, wherein said camber link means includes second and third linear, elongated rigid members.

5. The grain cart of claim 4, wherein said second linear, elongated member is pivotally coupled to said frame and to said first wheel support and said third linear, elongated member is pivotally coupled to said frame and to said second wheel support.

6. The grain cart of claim 5, wherein each of said first and second wheel supports include a spindle and axle combination.

7. The grain cart of claim 1, wherein said camber link means is disposed above said pivot link means and changes wheel camber from positive camber when said wheels are level on even ground to negative camber when said wheels are at different elevations as said wheels traverse uneven ground.

8. Apparatus for mounting a pair of side wheels on a grain cart, wherein the pair of side wheels includes an outer wheel with a first tire and an inner wheel with a second tire in contact with the soil, said apparatus comprising:
a longitudinal frame member disposed on a lateral portion of the grain cart;
first and second support members disposed on opposed sides of said frame member and rotationally coupled to an outer and an inner wheel, respectively;
first lower link means pivotally coupled to said longitudinal frame members as well as to said first and second support members for vertically displacing said wheels in opposite directions as the cart traverses an uneven soil surface and the relative height of said wheels changes; and
second upper link means shorter in length than said first lower link means and pivotally coupled to said longitudinal frame member as well as to said first and second support members for maintaining lateral spacing between contact points of said outer and inner wheels with the soil essentially unchanged as the relative height of said inner and outer wheels changes.

9. The apparatus of claim 8, wherein said first lower link means includes a first rigid, elongated, linear structural member pivotally coupled at respective ends to said first and second support members and pivotally coupled at an intermediate point along its length to said longitudinal frame member.

10. The apparatus of claim 9, wherein said second upper link means includes second and third rigid, elongated, linear structural members respectively coupling in a pivoting manner said first and second support members to said longitudinal frame member.

11. The apparatus of claim 8, wherein each of said first and second support members includes a respective spindle and hub combination coupled to an inner rim of a wheel and an axle coupled to said spindle.

12. A dual wheel arrangement including inner and outer wheels each with a respective tire mounted thereto for supporting a grain cart having a side frame member, said arrangement comprising:
first and second support members rotationally coupled to said inner and outer wheels, respectively, and disposed in facing relation on opposed sides of the cart's side frame member;
first lower linkage means for pivotally coupling said first and second support members to the side frame member wherein upward or downward generally vertical displacement of said first support member causes a complementary downward or upward displacement of said second support member as the tires traverse an uneven surface and the relative height of said inner and outer wheels changes; and
second upper linkage means for pivotally coupling said first and second support members to the side frame member and for changing tire camber from positive camber when the tires are in contact with a level surface to negative camber when the tires are in contact with an uneven surface and are at different heights to maintain lateral spacing between contact points of the tires with the surface essentially constant over a range of tire height differences and eliminate tire scrubbing, or spillage, as the grain cart traverses an uneven surface.

13. The arrangement of claim 12, wherein said second upper linkage means is shorter than said first lower linkage means.

14. The arrangement of claim 13, wherein said first lower linkage means includes a first linear, elongated rigid member pivotally coupled at respective ends to said first and second support members and pivotally coupled and at intermediate location along the length thereof to the side frame member.

15. The arrangement of claim 12, wherein said second upper linkage means includes second and third linear, elongated rigid members.

16. The arrangement of claim 15, wherein said second linear, elongated member is pivotally coupled to the side frame member and to said first support member and said third linear, elongated member is pivotally coupled to the side frame member and to said second support member.

17. The arrangement of claim 12, wherein each of said first and second support members includes a spindle and axle combination.

* * * * *

UNITED STATES PATENT AND TRADEMARK OFFICE
CERTIFICATE OF CORRECTION

PATENT NO. : 5,139,314
DATED : August 18, 1992
INVENTOR(S) : Harry C. Deckler

It is certified that error appears in the above-identified patent and that said Letters Patent is hereby corrected as shown below:

Claim 12, Col. 8, line 26, the last word should be --slippage--.

Signed and Sealed this

Twenty-eighth Day of September, 1993

Attest:

BRUCE LEHMAN

Attesting Officer

Commissioner of Patents and Trademarks